(12) United States Patent
Gorman et al.

(10) Patent No.: US 9,120,454 B2
(45) Date of Patent: Sep. 1, 2015

(54) VEHICLE AND AN INSTRUMENT PANEL FOR THE VEHICLE

(71) Applicant: GM GLOBAL TECHNOLOGY OPERATIONS LLC, Detroit, MI (US)

(72) Inventors: David J. Gorman, Troy, MI (US); Richard J. Lannen, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/087,177

(22) Filed: Nov. 22, 2013

(65) Prior Publication Data

US 2015/0145235 A1 May 28, 2015

(51) Int. Cl.
*B60R 21/205* (2011.01)

(52) U.S. Cl.
CPC .................................. *B60R 21/205* (2013.01)

(58) Field of Classification Search
USPC ............. 280/728.3, 732, 752; 296/70; 180/90
See application file for complete search history.

(56) References Cited

U.S. PATENT DOCUMENTS

| | | | |
|---|---|---|---|
| 3,837,668 A | | 9/1974 | Barenyi et al. |
| 4,362,331 A | * | 12/1982 | Harasaki et al. ......... 296/193.02 |
| 5,074,583 A | * | 12/1991 | Fujita et al. ................ 280/730.1 |
| 5,425,549 A | * | 6/1995 | Oda ........................... 280/728.2 |
| 6,276,739 B1 | | 8/2001 | Wich |
| 6,450,533 B1 | * | 9/2002 | Kimura et al. ................ 280/779 |
| 6,582,005 B2 | * | 6/2003 | Takano ............................ 296/70 |
| 7,607,691 B2 | * | 10/2009 | Arnold et al. ................. 280/751 |
| 7,770,914 B2 | * | 8/2010 | Dumbrique ................. 280/728.2 |
| 2001/0024035 A1 | * | 9/2001 | Scheib et al. .................. 280/779 |
| 2002/0003354 A1 | * | 1/2002 | Inoue et al. ..................... 296/70 |
| 2002/0074776 A1 | * | 6/2002 | Labrie et al. ............... 280/728.3 |
| 2004/0150251 A1 | | 8/2004 | Matsutani |
| 2006/0186650 A1 | * | 8/2006 | Kuwano et al. .............. 280/732 |
| 2009/0090211 A1 | * | 4/2009 | Kuwano ......................... 74/492 |
| 2009/0230745 A1 | * | 9/2009 | Jovicevic et al. ............. 297/341 |
| 2011/0187144 A1 | * | 8/2011 | Kwolek ....................... 296/37.8 |
| 2011/0215614 A1 | * | 9/2011 | Mani ........................ 296/193.02 |
| 2012/0187665 A1 | * | 7/2012 | Bristol et al. ............... 280/728.2 |
| 2013/0278001 A1 | * | 10/2013 | Zimmerman et al. ....... 296/1.08 |

FOREIGN PATENT DOCUMENTS

| | | |
|---|---|---|
| DE | 2054916 A1 | 5/1972 |
| DE | 2324571 A1 | 11/1973 |
| DE | 69007987 T2 | 11/1994 |
| DE | 29615364 U1 | 11/1996 |

(Continued)

*Primary Examiner* — Paul N Dickson
*Assistant Examiner* — Darlene P Condra
(74) *Attorney, Agent, or Firm* — Quinn Law Group, PLLC

(57) ABSTRACT

A vehicle is disclosed. A wall includes a first portion disposed adjacent to a first end, a second portion disposed adjacent to a second end and a middle portion disposed between the first and second portions. A panel includes a first panel portion disposed along the first portion, a second panel portion disposed along the second portion and a middle panel portion disposed along the middle portion. The panel extends outwardly away from the wall a distal surface to define a cavity. An airbag device is attached to the second portion and disposed inside the cavity. A beam is coupled to one of the first portion and the middle portion inside the cavity. The beam extends into the cavity from the first end of the wall along an axis such that the beam is spaced from the second panel portion and the second portion along the axis.

20 Claims, 3 Drawing Sheets

(56) References Cited

FOREIGN PATENT DOCUMENTS

| DE | 19720902 | A1 | 11/1998 |
|----|----------|----|---------|
| DE | 10240395 | A1 | 3/2004 |
| DE | 69923661 | T2 | 1/2006 |
| DE | 602004000648 | T2 | 9/2006 |
| DE | 102009019077 | A1 | 10/2010 |
| EP | 0378314 | A2 | 7/1990 |
| EP | 0827894 | A1 | 3/1998 |
| GB | 1375815 | A | 11/1974 |
| WO | 0015472 | A1 | 3/2000 |

* cited by examiner

VEHICLE AND AN INSTRUMENT PANEL FOR THE VEHICLE

TECHNICAL FIELD

The present disclosure relates to a vehicle and an instrument panel for the vehicle.

BACKGROUND

Many vehicles include a passenger compartment for receiving one or more passengers of the vehicle. Generally, these vehicles include an instrument panel and seats disposed inside the passenger compartment. In such vehicle architecture, a heating, ventilation and air conditioning (HVAC) unit and other components are mounted behind the instrument panel or dashboard. A frame of such a vehicle includes a first side wall adjacent to the driver side door and a second side wall adjacent to the passenger side door. A cross-car beam is attached to the frame to support the HVAC unit and other components of the vehicle, such as a steering wheel. The cross-car beam extends the entire width of the passenger compartment from adjacent to the driver side door to the passenger side door.

SUMMARY

The present disclosure provides a vehicle architecture which allows various components, such as a heating, ventilation and air conditioning (HVAC) unit to be moved outside of a passenger compartment which allows an instrument panel to be modified to reduce intrusion of the instrument panel into the passenger compartment.

The vehicle architecture includes a wall, and the wall includes a first end and a second end spaced from each other. The wall also includes a first portion disposed adjacent to the first end, a second portion disposed adjacent to the second end and a middle portion disposed between the first and second portions. The vehicle also includes a panel, such as the instrument panel, coupled to the wall. The panel includes a first panel portion disposed along the first portion of the wall, a second panel portion disposed along the second portion of the wall and a middle panel portion disposed along the middle portion of the wall. The panel extends outwardly away from the wall to a distal surface to define a cavity between the distal surface and the wall. The vehicle further includes an airbag device attached to the second portion of the wall. The airbag device is disposed inside the cavity. The vehicle also includes a beam coupled to one of the first portion and the middle portion of the wall inside the cavity. The beam extends into the cavity from the first end of the wall along an axis such that the beam is spaced from the second panel portion of the panel and the second portion of the wall along the axis.

The present disclosure also provides a vehicle including a frame defining a passenger compartment. The vehicle also includes a wall attached to the frame to define a boundary of the passenger compartment. The wall includes a first end and a second end spaced from each other. The wall also includes a first portion disposed adjacent to the first end, a second portion disposed adjacent to the second end and a middle portion disposed between the first and second portions. The vehicle further includes a panel coupled to the wall and disposed inside the passenger compartment. The panel includes a first panel portion disposed along the first portion of the wall, a second panel portion disposed along the second portion of the wall and a middle panel portion disposed along the middle portion of the wall. The panel extends outwardly away from the wall into the passenger compartment to a distal surface to define a cavity between the distal surface and the wall. The vehicle further includes an airbag device attached to the second portion of the wall and disposed inside the cavity. The vehicle also includes a beam coupled to one of the first portion and the middle portion of the wall inside the cavity. The beam extends into the cavity from the first end of the wall along an axis such that the beam is spaced from the second panel portion of the panel and the second portion of the wall along the axis.

By spacing the beam from the second panel portion of the panel and the second portion of the wall, the amount of space the panel occupies inside the passenger compartment can be decreased, thus providing a spacious passenger compartment.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
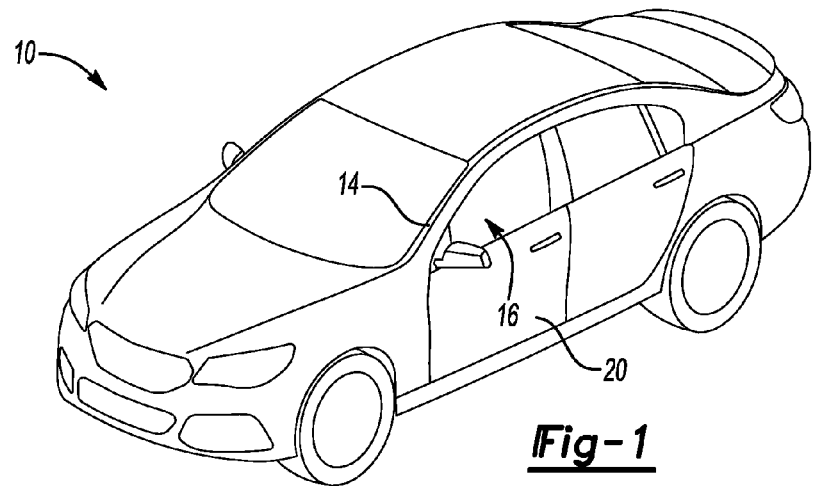
FIG. 1 is a schematic perspective view of a vehicle.

Referring to the Figures, wherein like numerals indicate like or corresponding parts throughout the several views, a vehicle 10 is generally shown in FIG. 1.

Figure 2:
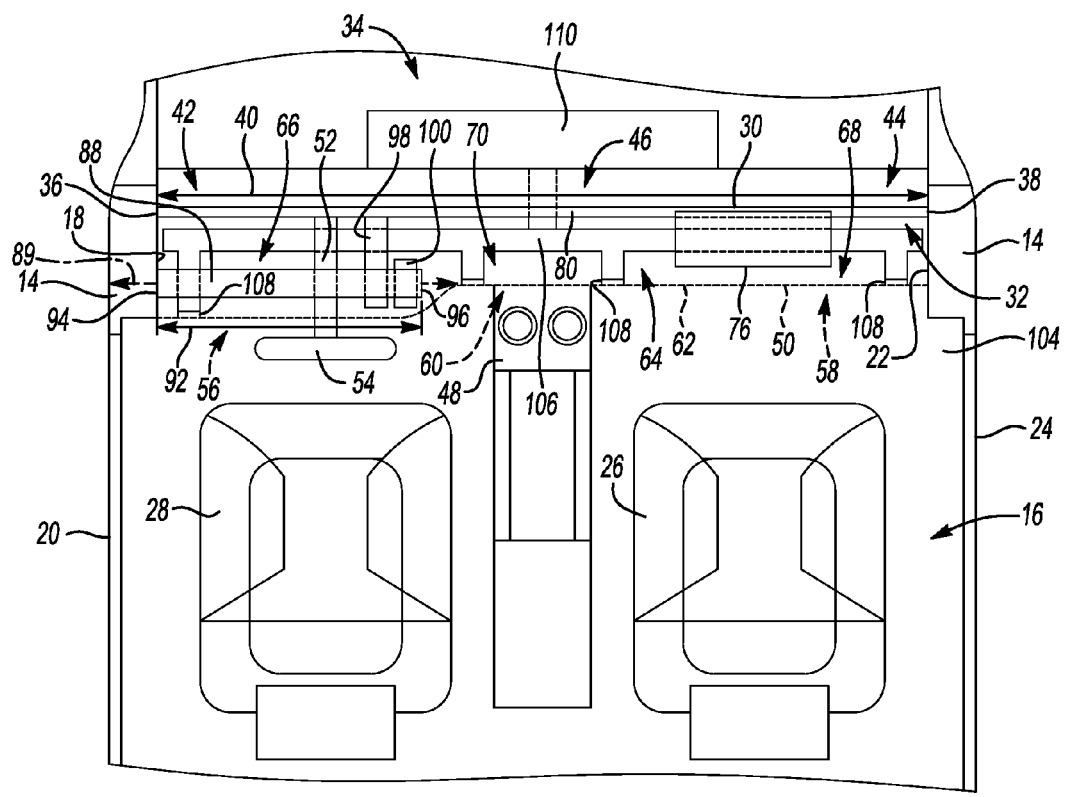
FIG. 2 is a schematic fragmentary top view of the vehicle of FIG. 1 with a roof and a hood removed, a distal surface of a panel shown in phantom lines whereby to illustrate a traversing cavity formed between the distal surface of the panel and a wall defining the forward end of the vehicle's passenger compartment, and with a traversing beam extending into the cavity a first distance.
Figure 3:
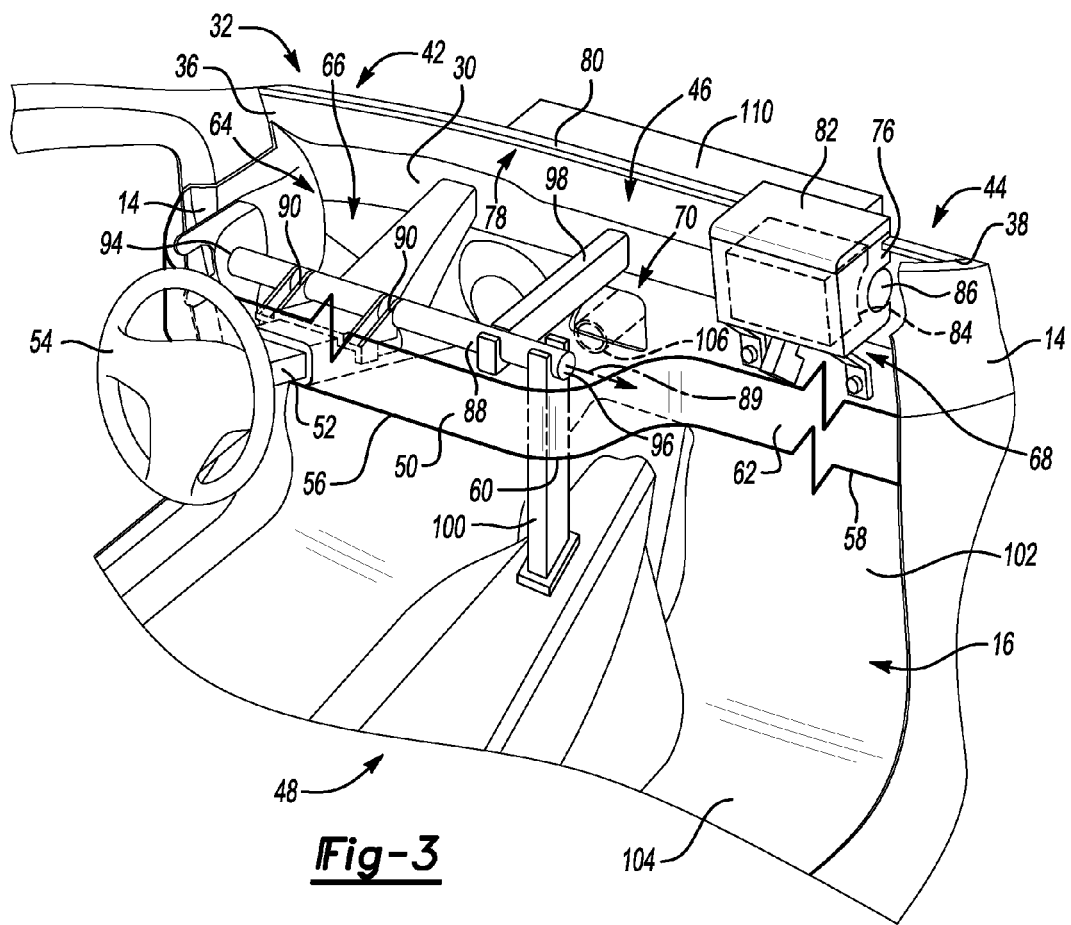
FIG. 3 is a schematic fragmentary perspective view of the panel and a frame of the vehicle of FIG. 1, with the wall extending between the frame and the beam extending partially between the frame, and with a bladder of an airbag device in phantom lines in a pre-deployed position and the panel removed.

Turning to FIGS. 2 and 3, the vehicle 10 includes a frame 14 defining a passenger compartment 16. The frame 14 can be a chassis, a support structure, a body, a bracket structure or any other suitable support. The frame 14 includes a first side 18 disposed adjacent to a driver side door 20 and a second side 22 disposed adjacent to a passenger side door 24.

Continuing with FIGS. 2 and 3, the vehicle 10 can include a seat 26 secured to the frame 14 inside the passenger compartment 16. More specifically, the seat 26 can be defined as a passenger seat 26 disposed adjacent to the passenger side door 24 and the vehicle 10 can further include a driver seat 28 disposed adjacent to the driver side door 20. More specifically, the passenger seat 26 is a front passenger seat 26. It is to also be appreciated that the vehicle 10 can optionally include a back seat secured to the frame 14 in a spaced relationship behind the passenger and driver seats 26, 28 inside the passenger compartment 16.

Figure 4:
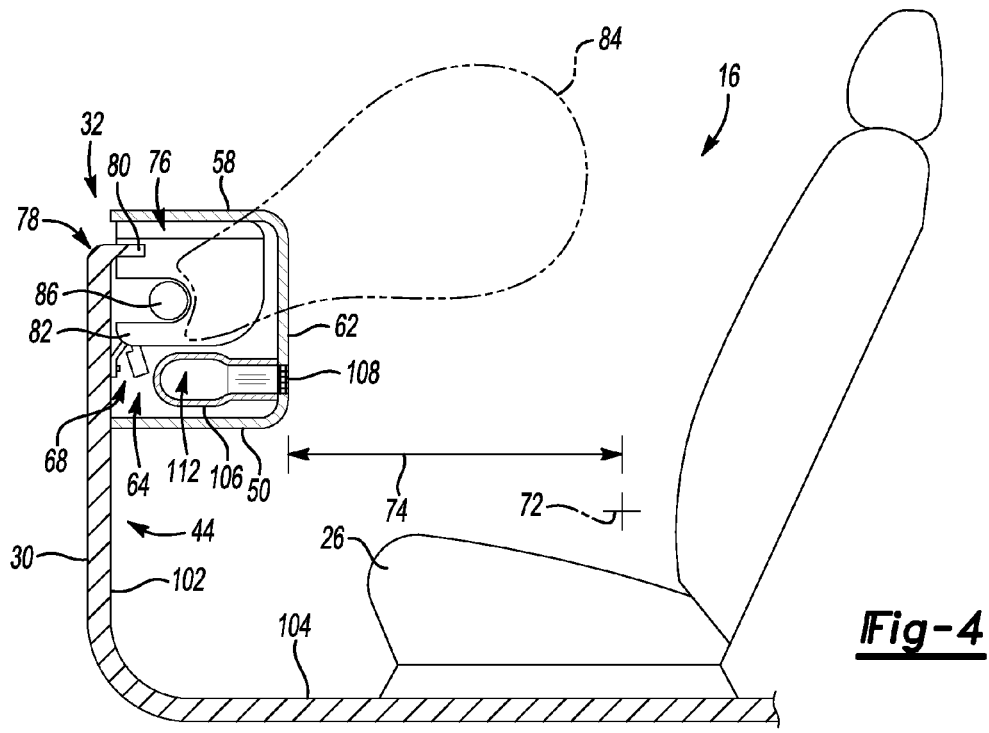
FIG. 4 is a schematic cross-sectional view of the wall and a portion of the panel illustrating the airbag device disposed inside the cavity, with the bladder in phantom lines in a deployed position.

Referring to FIGS. 2-4, the vehicle 10 includes a wall 30. In certain embodiments, the wall 30 is attached to the frame 14 to define a boundary 32 of the passenger compartment 16. Specifically, the wall 30 can be the frontal boundary of the passenger compartment 16. For example, the wall 30 can be the boundary 32 between the passenger compartment 16 and a frontal compartment 34 of the vehicle 10. Generally, the frontal compartment 34 of the vehicle 10 can house an engine block, a transmission, a radiator, etc., or can be utilized for storage.

As best shown in FIG. 2, the wall 30 includes a first end 36 and a second end 38 spaced from each other. Generally, the wall 30 defines a total distance 40 between the first and second ends 36, 38 (of the wall 30). The total distance 40 extends across the passenger compartment 16 between the first and second ends 36, 38. In other words, the total distance 40 extends across the front of the passenger compartment 16 between the first and second sides 18, 22 of the frame 14.

Furthermore, the wall 30 includes a first portion 42 disposed adjacent to the first end 36, a second portion 44 disposed adjacent to the second end 38 and a middle portion 46 disposed between the first and second portions 42, 44. For example, the driver seat 28 generally aligns behind the first portion 42 and the passenger seat 26 generally aligns behind the second portion 44. A center console 48 (see FIG. 2) can be disposed between the passenger and driver seats 26, 28 with the center console 48 generally aligning behind the middle portion 46.

Referring to FIGS. 2 and 4, the vehicle 10 further includes a panel 50 (in phantom lines in FIG. 2) coupled to the wall 30. The panel 50 is disposed inside the passenger compartment 16. The panel 50 can include various gauges to display various information inside the passenger compartment 16. As such, the panel 50 can be an instrument panel or a dash board.

Turning to FIGS. 2 and 3, the vehicle 10 can include a steering column 52 to steer the vehicle 10. The steering column 52 is partially disposed inside the panel 50 and partially extends outwardly into the passenger compartment 16. A steering wheel 54 is coupled to the steering column 52 and exposed inside the passenger compartment 16 such that a passenger can steer the vehicle 10. Generally, the steering wheel 54 faces the driver seat 28.

Referring to FIG. 2, the panel 50 extends along the total distance 40 of the wall 30. Specifically, the panel 50 (in phantom lines in FIG. 2 and fragmented in FIG. 3) includes a first panel portion 56 disposed along the first portion 42 of the wall 30, a second panel portion 58 disposed along the second portion 44 of the wall 30 and a middle panel portion 60 disposed along the middle portion 46 of the wall 30. The Figures illustrate one suitable configuration of the panel 50 and it is to be appreciated that the panel 50 can be other configurations.

Continuing with FIGS. 2 and 4, the panel 50 includes a distal surface 62, and specifically, the panel extends outwardly away from the wall 30 to the distal surface 62 to define a cavity 64 between the distal surface 62 and the wall 30. In other words, the panel 50 extends outwardly away from the wall 30 into the passenger compartment 16 to the distal surface 62. Specifically, the distal surface 62 extends away from the wall 30 toward the seats 26, 28. Generally, a portion of the cavity 64 along the first panel portion 56 defines a first size 66, a portion of the cavity 64 along the second panel portion 58 defines a second size 68 and a portion of the cavity 64 along the middle panel portion 60 defines a third size 70. The steering column 52 extends outwardly from the panel 50 along the first panel portion 56, and thus, the first size 66 is configured to receive and support the steering column 52. Simply stated, the first size 66 is disposed between the distal surface 62 along the first panel portion 56 and the first portion 42 of the wall 30, the second size 68 is disposed between the distal surface 62 along the second panel portion 58 and the second portion 44 of the wall 30, and the third size 70 is disposed between the distal surface 62 along the middle panel portion 60 and the middle portion 46 of the wall 30.

Referring to FIG. 4, generally, the seat 26 is spaced from the distal surface 62 of the panel 50. The seat 26 can include a seating reference point 72 spaced a predetermined distance 74 from the distal surface 62 of the panel 50 along the second panel portion 58. Specifically, the passenger seat 26 includes the seating reference point 72, and therefore, the seating reference point 72 of the passenger seat 26 is spaced the predetermined distance 74 from the distal surface 62 along the second panel portion 58. In certain embodiments, the predetermined distance 74 can be of from about 750.0 millimeters to about 850.0 millimeters. The seating reference point 72 location is based on the SgRP $50^{th}$ percentile male occupant. The SgRP is the theoretical hip point, also referred to as the R-point, of the $50^{th}$ percentile male, which can be utilized by manufacturers when designing the vehicle 10. The SgRP is measured in accordance with the test method set forth by the Society of Automotive Engineers (SAE) SAEJ826.

Various components can be disposed in the cavity 64, some of which are discussed below. Referring to FIGS. 2 and 3, for example, the vehicle 10 includes an airbag device 76 attached to the second portion 44 of the wall 30 and disposed inside the cavity 64. In certain embodiments, the wall 30 extends to an edge portion 78 between the first and second ends 36, 38, with the airbag device 76 attached to the edge portion 78. Furthermore, in certain embodiments, the edge portion 78 can include a flange 80 extending outwardly toward the distal surface 62. Therefore, in certain embodiments, the airbag device 76 can be attached to the flange 80. The airbag device 76 can be attached to the wall 30 by fasteners, brackets, braces, or any other suitable components. As one example, the airbag device 76 can be utilized as an upper airbag for the front passenger seat 26 area.

Continuing with FIG. 3, the airbag device 76 can include a housing 82 attached to the wall 30 and a bladder 84 supported by the housing 82. In certain embodiments, the housing 82 is attached to the edge portion 78. More specifically, in certain embodiments, the housing 82 is attached to the edge portion 78 along the second portion 44 of the wall 30. Furthermore, in certain embodiments, the housing 82 can be attached to the flange 80. It is to be appreciated that the airbag device 76 can be attached to the wall 30 in any suitable location along the second portion 44.

Generally, the bladder 84 is selectively inflatable. Specifically, the bladder 84 can present a pre-deployed position being deflated and a deployed position being inflated. More specifically, the bladder 84 is contained in the housing 82 when in the pre-deployed position and extends outwardly from the housing 82 through the second panel portion 58 when in the deployed position. Furthermore, the airbag device 76 can include an inflator 86 secured to the housing 82 and operably coupled to the bladder 84 to selectively inflate the bladder 84. The pre-deployed position is shown in FIGS. 2 and 3 and the deployed position is shown in FIG. 4. Even though not illustrated in FIG. 4, it is to be appreciated that a portion of the panel 50 will open when the bladder 84 is inflated into the passenger compartment 16. It is to also be appreciated that the inflator 86 can be connected to a power source to supply power to the inflator 86 when actuated to inflate the bladder 84.

Figure 5:
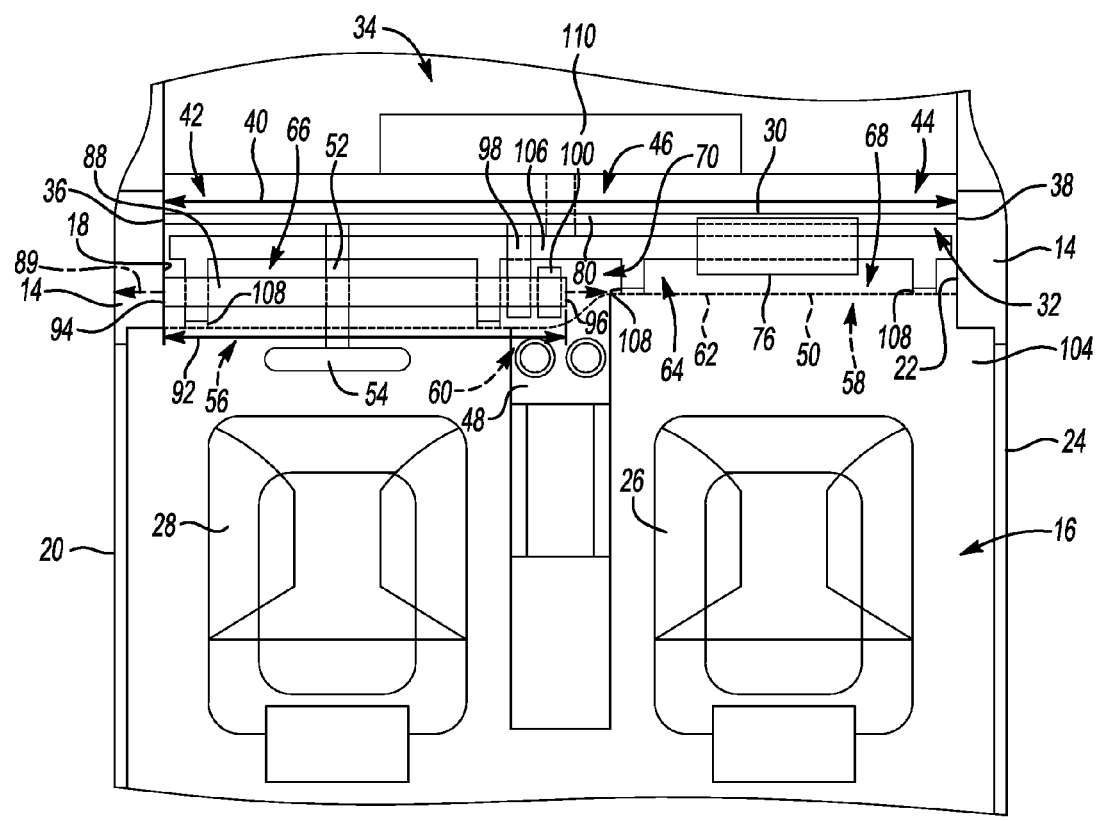
FIG. 5 is a schematic fragmentary top view of the vehicle of FIG. 1 with the roof and the hood removed, with the distal surface of the panel shown in phantom lines whereby to illustrate the cavity formed between the distal surface of the panel and the wall defining the forward end of the vehicle's passenger compartment, and with the beam extending into the cavity further than as illustrated in FIG. 2.

As another example, as shown in FIGS. 2 and 3, the vehicle 10 also includes a beam 88 coupled to one of the first portion 42 and the middle portion 46 of the wall 30 inside the cavity 64. The beam 88 extends into the cavity 64 from the first end 36 of the wall 30 along an axis 89 such that the beam 88 is spaced from the second panel portion 58 of the panel 50 and the second portion 44 of the wall 30 along the axis 89. Therefore, the beam 88 is spaced from the cavity 64 along the second panel portion 58 of the panel 50 and the second portion 44 of the wall 30. Generally, the steering column 52 is attached to the beam 88 such that the beam 88 supports the steering column 52. Specifically, the steering column 52 is attached to the beam 88 along the first portion 42, and thus a portion of the steering column 52 is disposed inside the cavity 64 along the first portion 42. The steering column 52 can be attached to the beam 88 by one or more brackets 90 (see FIG. 3), supports, braces, etc. For illustrative purposes only, the bracket 90 has been removed from FIGS. 2 and 5.

As best shown in FIG. 2, generally, the beam 88 extends into the cavity 64 a first distance 92 from the first end 36 of the wall 30. Furthermore, a first side end 94 of the beam 88 can be attached to the first side 18 of the frame 14 and a second side end 96 of the beam 88 is coupled to one of the middle portion 46 and the first portion 42 of the wall 30. Therefore, the second side end 96 of the beam 88 is spaced from the second side 22 of the frame 14, as well as, spaced from the second end 38 of the wall 30. As such, the beam 88 does not extend all the way across the passenger compartment 16 between the first and second sides 18, 22 of the frame 14. In other words, the beam 88 extends partially across the passenger compartment 16 which provides a space savings in the cavity 64 by eliminating some of the beam 88; and therefore, the distance that the distal surface 62 of the panel 50 extends into the passenger compartment 16 can be reduced or decreased. By spacing the beam 88 away from the second portion 44, the cavity 64 along the second portion 44 can be decreased in size which allows for a spacious passenger compartment 16. Furthermore, the beam 88 can be spaced from the middle portion 46, and thus, the cavity 64 along the second portion 44 and the middle portion 46 can be decreased in size which again allows for a spacious passenger compartment 16.

In certain embodiments, the first distance 92 is about one-third to about three-fourth less than the total distance 40 (of the wall 30). In other embodiments, the first distance 92 is about one-half to about two-third less than the total distance 40 (of the wall 30). In yet other embodiments, the first distance 92 is less than one-half of the total distance 40 (of the wall 30). In yet other embodiments, the first distance 92 is about one-half of the total distance 40 (of the wall 30). Again, the beam 88 does not extend all the way across the passenger compartment 16 between the first and second sides 18, 22 of the frame 14. As such, the beam 88 is spaced away from the second portion 44 of the wall 30 such that the second size 68 is less than the first size 66. In one embodiment, the beam 88 is coupled to the first portion 42 of the wall 30, and therefore, each of the second and third sizes 68, 70 are less than the first size 66 (see FIG. 2). In another embodiment, the beam 88 is coupled to the middle portion 46 of the wall 30, and therefore, the second size 68 is less than each of the first and third sizes 66, 70 (see FIGS. 3 and 5).

Referring to FIGS. 2 and 3, in one embodiment, the second side end 96 of the beam 88 can be supported by a first bracket 98. In another embodiment, the second side end 96 of the beam 88 can be supported by the first bracket 98 and a second bracket 100. Generally, the first and/or second bracket 98, 100 couple the beam 88 to the wall 30, and more specifically, couple the second side end 96 of the beam 88 to one of the first and middle portions 42, 46 of the wall 30.

Furthermore, the wall 30 can include a back portion 102 and a bottom portion 104 adjacent to the back portion 102, with the first bracket 98 attached to one of the back portion 102 and the bottom portion 104 to couple the beam 88 to the wall 30. Generally, the back portion 102 can separate the passenger compartment 16 from the frontal compartment 34 while the bottom portion 104 can form part of a floor board of the vehicle 10. Additionally, the back portion 102 can include the edge portion 78, and thus the flange 80, which are discussed above.

The first, second and middle portions 42, 44, 46 are disposed respective along the back and bottom portions 102, 104, and therefore, in one embodiment, the first bracket 98 is attached to the bottom portion 104 of the wall 30 along one of the first and middle portions 42, 46, and in another embodiment, the first bracket 98 is attached to the back portion 102 of the wall 30 along one of the first and middle portions 42, 46. When utilizing the first and second brackets 98, 100, the first bracket 98 is attached to one of the back portion 102 and the bottom portion 104 along one of the first and middle portions 42, 46 and the second bracket 100 is attached to the other one of the back portion 102 and the bottom portion 104 along one of the first and middle portions 42, 46. It is to be appreciated that one or more brackets, supports, braces, etc. can be utilized to support the second side end 96 of the beam 88.

Turning to FIGS. 2 and 4, the vehicle 10 can also include a duct 106 disposed inside the cavity 64 along the first and second panel portions 56, 58 and the middle panel portion 60. In certain embodiments, the duct 106 is spaced from the airbag device 76, such as for example, the housing 82 of the airbag device 76 and the inflator 86 of the airbag device 76. The duct 106 directs a gaseous fluid, such as air, i.e., conditioned air, heated air, etc., into the passenger compartment 16. One or more vents 108 can be attached to the panel 50, with the duct 106 in fluid communication with the vents 108 to direct the gaseous fluid into the passenger compartment 16. It is to be appreciated that the duct 106 and the vents 108 can be any suitable location and configuration.

Referring to FIG. 2, the vehicle 10 can also include a heating, ventilation and air conditioning (HVAC) unit 110 disposed outside of the passenger compartment 16. Therefore, the HVAC unit 110 is not disposed in the cavity 64 of the panel 50, and thus removing the HVAC unit 110 from the cavity 64 allows the panel 50 to decrease in size which provides additional space savings in the passenger compartment 16. In other words, by disposing the HVAC unit 110 outside of the passenger compartment 16, the cavity 64 along the second portion 44 can be decreased in size which allows for a spacious passenger compartment 16. For example, the HVAC unit 110 can be disposed in the frontal compartment 34 of the vehicle 10 or any other suitable location outside of the passenger compartment 16. In certain embodiments, the duct 106 and the HVAC unit 110 are coupled to each other through the wall 30, and in one embodiment, through the back portion 102 of the wall 30. Furthermore, disposing the HVAC unit 110 outside of the passenger compartment 16 allows the airbag device 76 to be attached to the wall 30 instead of various other components, such as, the panel 50, the beam 88, etc. Additionally, disposing the HVAC unit 110 outside of the passenger compartment 16 allows the beam 88 to be shorter because the beam 88 does not have to be designed to support the HVAC unit 110.

Generally, the duct 106 defines a chamber 112 (see FIG. 4) in fluid communication with the HVAC unit 110 and the passenger compartment 16. As such, the gaseous fluid is guided through the chamber 112 from the HVAC unit 110 into the passenger compartment 16 through the vent(s) 108. For example, air can be guided through the chamber 112 and into the passenger compartment 16.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
   a wall including a first end and a second end spaced from each other, wherein the wall includes a first portion disposed adjacent to the first end, a second portion disposed adjacent to the second end and a middle portion disposed between the first and second portions;
   a panel coupled to the wall, wherein the panel includes a first panel portion disposed along the first portion of the wall, a second panel portion disposed along the second portion of the wall and a middle panel portion disposed along the middle portion of the wall;
   wherein the panel extends outwardly away from the wall to a distal surface to define a cavity between the distal surface and the wall;
   an airbag device directly attached to the second portion of the wall and disposed inside the cavity; and
   a beam coupled to one of the first portion and the middle portion of the wall inside the cavity, with the beam extending into the cavity from the first end of the wall along an axis such that the beam is spaced from the cavity that is disposed between the second panel portion of the panel and the second portion of the wall.

2. A vehicle as set forth in claim 1 wherein the wall extends to an edge portion between the first and second ends, with the airbag device being attached to the edge portion.

3. A vehicle as set forth in claim 2 wherein the airbag device includes a housing engaging the edge portion and a bladder supported by the housing, with the bladder being selectively inflatable.

4. A vehicle as set forth in claim 2 wherein the edge portion includes a flange extending outwardly toward the distal surface, with the airbag device being attached to the flange.

5. A vehicle as set forth in claim 4 wherein the airbag device includes a housing attached to the flange and a bladder supported by the housing, with the bladder being selectively inflatable.

6. A vehicle as set forth in claim 1 further including a duct disposed inside the cavity along the first and second panel portions and the middle panel portion.

7. A vehicle as set forth in claim 6 wherein the airbag device includes a housing attached to the wall and a bladder supported by the housing, and wherein the airbag device includes an inflator secured to the housing and operably coupled to the bladder to selectively inflate the bladder, with the duct being spaced from the housing and the inflator.

8. A vehicle as set forth in claim 1 wherein a portion of the cavity along the first panel portion defines a first size, a portion of the cavity along the second panel portion defines a second size and a portion of the cavity along the middle panel portion defines a third size, with the beam spaced away from the second portion of the wall such that the second size is less than the first size.

9. A vehicle as set forth in claim 8 wherein the beam is coupled to the first portion of the wall, with each of the second and third sizes being less than the first size.

10. A vehicle as set forth in claim 8 wherein the beam is coupled to the middle portion of the wall, with the second size being less than each of the first and third sizes.

11. A vehicle as set forth in claim 1 wherein:
    the wall defines a total distance between the first and second ends;
    the beam extends into the cavity a first distance from the first end; and
    the first distance is about one-third to about three-fourth less than the total distance.

12. A vehicle as set forth in claim 1 wherein:
    the wall defines a total distance between the first and second ends;
    the beam extends into the cavity a first distance from the first end; and
    the first distance is about one-half to about two-third less than the total distance.

13. A vehicle as set forth in claim 1 wherein:
    the wall defines a total distance between the first and second ends;
    the beam extends into the cavity a first distance from the first end; and
    the first distance is less than one-half of the total distance.

14. A vehicle comprising:
    a frame defining a passenger compartment;
    a wall attached to the frame to define a boundary of the passenger compartment, wherein the wall includes a first end and a second end spaced from each other, and with the wall including a first portion disposed adjacent to the first end, a second portion disposed adjacent to the second end and a middle portion disposed between the first and second portions;
    a panel coupled to the wall and disposed inside the passenger compartment, wherein the panel includes a first panel portion disposed along the first portion of the wall, a second panel portion disposed along the second portion of the wall and a middle panel portion disposed along the middle portion of the wall;
    wherein the panel extends outwardly away from the wall into the passenger compartment to a distal surface to define a cavity between the distal surface and the wall;
    an airbag device attached to the second portion of the wall and disposed inside the cavity; and
    a beam coupled to one of the first portion and the middle portion of the wall inside the cavity, with the beam extending into the cavity from the first end of the wall along an axis and terminates before the cavity that is disposed between the second panel portion of the panel and the second portion of the wall.

15. A vehicle as set forth in claim 14 further including a seat secured to the frame inside the passenger compartment, with the seat spaced from the distal surface of the panel, and wherein the seat includes a seating reference point spaced a predetermined distance from the distal surface of the panel along the second panel portion, wherein the predetermined distance is of from about 750.0 millimeters to about 850.0 millimeters.

16. A vehicle as set forth in claim 14 further including a heating, ventilation and air conditioning (HVAC) unit disposed outside of the passenger compartment, and further including a duct disposed inside the cavity along the first and second panel portions and the middle panel portion, with the duct and the HVAC unit coupled to each other through the wall, with the duct defining a chamber in fluid communication with the HVAC unit and the passenger compartment.

17. A vehicle as set forth in claim 16 further including a seat secured to the frame inside the passenger compartment, with the seat spaced from the distal surface of the panel, and wherein the seat includes a seating reference point spaced a predetermined distance from the distal surface of the panel along the second panel portion, wherein the predetermined distance is of from about 750.0 millimeters to about 850.0 millimeters.

18. A vehicle as set forth in claim 14 further including a steering column attached to the beam, with the beam coupled to the first portion of the wall, and wherein the wall defines a total distance between the first and second ends, and wherein the beam extends into the cavity a first distance from the first end, and wherein the first distance is about one-third to about three-fourth less than the total distance.

19. A vehicle as set forth in claim 14 further including a steering column attached to the beam, with the beam coupled to the middle portion of the wall, and wherein the wall defines a total distance between the first and second ends, and wherein the beam extends into the cavity a first distance from the first end, and wherein the first distance is about one-third to about three-fourth less than the total distance.

20. A vehicle as set forth in claim 14 wherein the wall extends to an edge portion between the first and second ends, and wherein the airbag device includes a housing engaging the edge portion and a bladder supported by the housing, with the bladder being selectively inflatable.

\* \* \* \* \*